United States Patent
Montalvo

(10) Patent No.: US 6,522,895 B1
(45) Date of Patent: Feb. 18, 2003

(54) INTEGRATED TRANSMITTER AND RECEIVER COMPONENTS FOR A DUAL-BAND TRANSCEIVER

(75) Inventor: Antonio Montalvo, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/224,344

(22) Filed: Dec. 31, 1998

(51) Int. Cl.$^7$ ................................................ H04B 1/38
(52) U.S. Cl. ........................... 455/553; 455/78; 455/83; 455/188.1
(58) Field of Search ..................... 455/73, 78, 82, 455/84, 86, 317, 522, 188.1, 333, 323, 456, 550, 126, 552, 313, 90, 553, 83

(56) References Cited

U.S. PATENT DOCUMENTS

| | | | | |
|---|---|---|---|---|
| 5,551,075 A | * | 8/1996 | Caux ........................... | 455/333 |
| 5,751,820 A | * | 5/1998 | Taenzer ....................... | 381/312 |
| 5,903,178 A | * | 5/1999 | Miyatsuji .................... | 327/308 |
| 6,025,850 A | * | 2/2000 | Kang et al. ................. | 370/320 |
| 6,066,989 A | * | 5/2000 | Knecht et al. ................ | 331/18 |
| 6,075,995 A | * | 6/2000 | Jensen et al. ................ | 455/550 |
| 6,115,595 A | * | 9/2000 | Rodal .......................... | 455/333 |
| 6,125,266 A | * | 9/2000 | Matero et al. ............... | 455/126 |

FOREIGN PATENT DOCUMENTS

| | | |
|---|---|---|
| EP | 0 823 790 | 8/1997 |
| GB | 2 310 342 | 8/1997 |

* cited by examiner

Primary Examiner—Vivian Chin
Assistant Examiner—John J Lee
(74) Attorney, Agent, or Firm—Coats & Bennett, P.L.L.C.

(57) ABSTRACT

A transceiver of a dual-band radio is provided that selectively transmits and receives on either of a first frequency and a second frequency wherein the transceiver includes an integrated circuit having a power amplifier configured to amplify signals for transmission on a first frequency, and a low-noise amplifier configured to amplify signals received on the second frequency. The transceiver may further include a second integrated circuit having a power amplifier configured to amplify signals for transmission on a second frequency, and a low-noise amplifier configured to amplify signals received on the first frequency.

14 Claims, 3 Drawing Sheets

US 6,522,895 B1

INTEGRATED TRANSMITTER AND RECEIVER COMPONENTS FOR A DUAL-BAND TRANSCEIVER

FIELD OF THE INVENTION

This invention relates to the field of dual-band radios, and, more specifically, to the integration of components of dual-band transceivers.

BACKGROUND OF THE INVENTION

In the current market for wireless telephones (also called mobile phones, cell phones, mobile stations, etc.), there is a strong desire to reduce size and cost of the wireless telephone while simultaneously improving performance. One approach to reducing the size and cost of the wireless telephone is to increase the level of component integration. In the current art, however, the receiver front end (including a low noise amplifier) and transmitter power amplifiers have not been integrated because the transmitter's power amplifier may generate interference at the receiver. The integration of the transmitter and receiver amplifiers has not been achieved despite the fact that there are advantages for having the low-noise receiver amplifier built on the same substrate as the transmitter power amplifier to optimize the common characteristics.

SUMMARY OF THE INVENTION

In accordance with one aspect of this invention, a transceiver front end is provided that selectively transmits and receives on either of a first frequency and a second frequency wherein the front end comprises an integrated circuit having a power amplifier configured to amplify signals for transmission on a first frequency and a low-noise amplifier configured to amplify signals received on the second frequency.

In accordance with another aspect of this invention, the transceiver further includes a local oscillator and the integrated circuit includes a down-converter connected to the low-noise amplifier and the local oscillator that converts a signal on the second frequency to an intermediate frequency.

In accordance with a further aspect of this invention, the integrated circuit is a first integrated circuit and the transceiver further includes a second integrated circuit having a power amplifier configured to amplify signals for transmission on the second frequency and a low-noise amplifier configured to amplify signals received on the first frequency. The second integrated circuit may also include a second down-converter connected to the low-noise amplifier and the local oscillator. Further, either or both of the first and second integrated circuits may include a substrate of gallium arsenide (GaAs). The first frequency and the second frequency may be different frequencies.

In accordance with another aspect of this invention, a transceiver that selectively transmits and receives on either the first frequency and the second frequency band is disclosed wherein the radio has a multi-stage first frequency band transmitter, a multi-stage first frequency band receiver, a multi-stage second frequency band transmitter, and a multi-stage second frequency band receiver. The transceiver includes a first substrate having one or more stages of the multi-stage first frequency band transmitter and one or more stages of the second multi-frequency band receiver and a second substrate having one or more stages of the multi-stage second frequency band transmitter and one or more stages of the multi-stage first frequency band receiver. Further, a first of the stages of the multi-stage first frequency transmitter comprises a power amplifier and the one or more stages of the multi-stage first frequency band transmitter comprises the power amplifier. Additionally, the first of the stages of the multi-stage second frequency transmitters comprises a power amplifier and one or more of the stages of the multi-stage second frequency band transmitter on the first substrate comprise a power amplifier. Further, both the first frequency and the second frequency receivers may include a mixer.

In accordance with another aspect of this invention, a process for fabricating a dual-band transceiver front end is disclosed, wherein the transceiver has a multi-stage first frequency transmitter, a multi-stage first frequency receiver, a multi-stage second frequency transmitter and a multi-stage second frequency receiver. The process includes providing a substrate, fabricating one or more stages of the multi-stage first frequency transmitter on the substrate and fabricating one or more stages of the multi-stage second frequency receiver on the same substrate. Fabricating one or more of the stages of the first frequency transmitter may comprise fabricating a power amplifier on the substrate and fabricating one or more stages of a multi-stage second frequency receiver comprises fabricating a low-noise amplifier on the substrate. The process may further include fabricating a down-converter on the substrate connected to the low-noise amplifier.

In accordance with a further aspect of this invention, the substrate may be a first substrate and the process further includes providing a second substrate, fabricating one or more stages of multiple stage second frequency transmitter on the second substrate and fabricating one or more stages of the multi-stage first frequency receiver on the substrate. The steps of fabricating on this second substrate may include fabricating a power amplifier, fabricating a low-noise amplifier and fabricating a down-converter.

BRIEF DESCRIPTION OF THE DRAWINGS

A more complete understanding of this invention may be obtained from a consideration of the following detailed description in conjunction with the drawings in which.

DETAILED DESCRIPTION.

Figure 1:
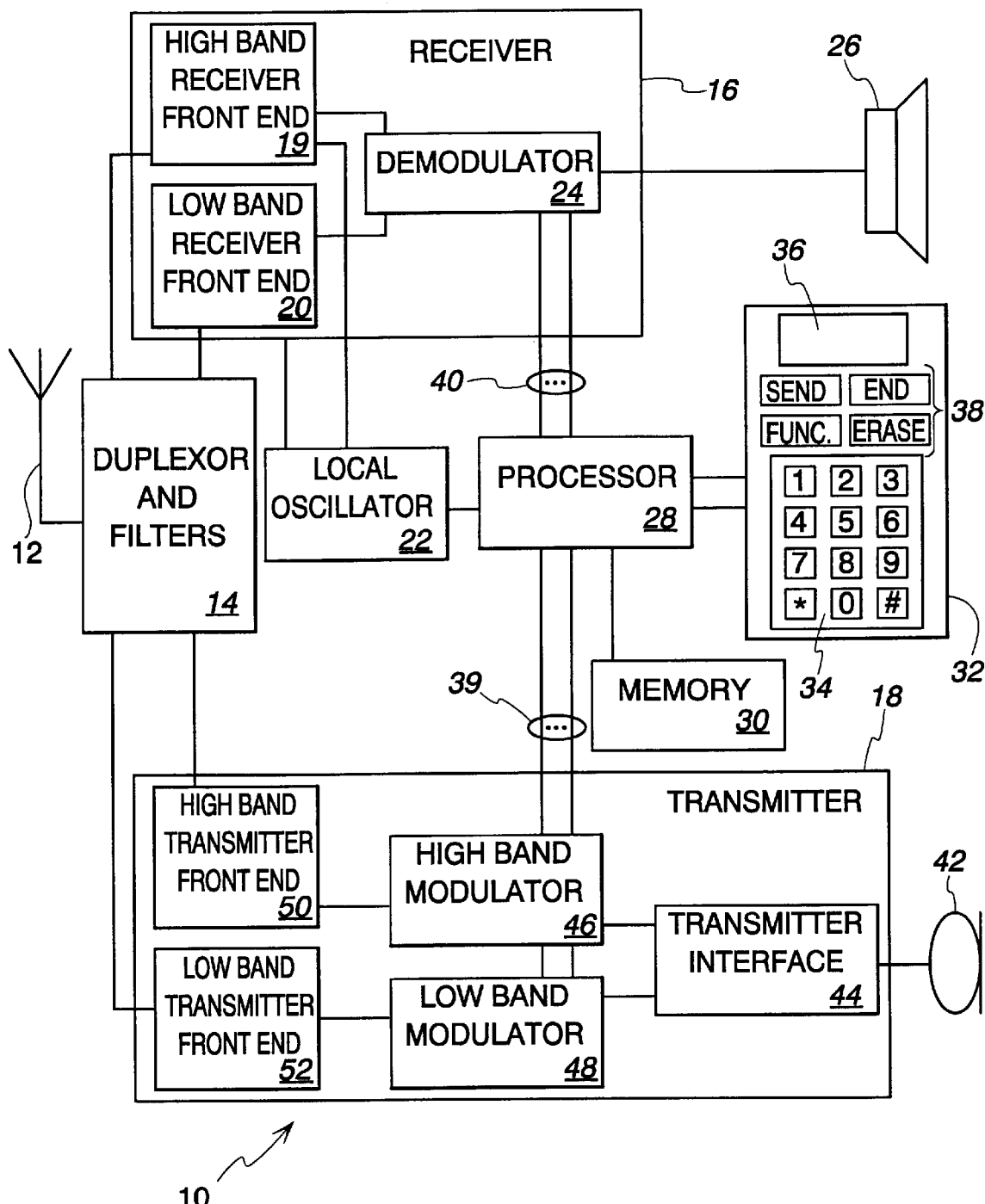
FIG. 1 is a block diagram of a dual-band wireless telephone where an exemplary embodiment of this invention may be practiced.

FIG. 1 is a block diagram of a dual-band wireless telephone 10 that employs an exemplary embodiment of this invention. Wireless telephone 10 includes an antenna 12 for sending and receiving radio frequency signals. Antenna 12 is connected to a duplexor 14, which includes a plurality of filters, as known in the art, that permits the wireless telephone 10 to transmit and receive on the same antenna 12. The duplexor 14 is connected to a transceiver comprising a multi-stage receiver 16 and a multi-stage transmitter 18. Multi-stage receiver 16 includes stages for amplifying the incoming signal, down-converting to an intermediate frequency, demodulating and decoding (if necessary). In this exemplary embodiment of this invention, multi-stage receiver 16 include a high-band front end 19 and a low-band front end 20. As will be described further, below, both high-band front end 19 and low-band front end 20 include at least the amplification stage and may advantageously include the down-converting stage.

A radio frequency signal on either band is received at antenna 12, sent through duplexor 14 and to the appropriate high-band 19 or low-band 20 front end. The two front ends 19 and 20 amplify and down-convert the radio frequency signals by mixing their respective signals with a frequency generated by local oscillator 22 and then filtered in an intermediate frequency filter (not shown but well known in the art). Demodulator 24 receives the signal from both high-band front end 19 and low-band front end 20 at the intermediate frequency and demodulates it. There may be other stages, such as decoding, deinterleaving, etc., as known in the art. The signal is separated into control channels for control messages and a traffic channel for sound or data. Sound is delivered to speaker 26. Receiver 16 delivers messages from the control channel to a processor 28.

Processor 28 controls the functionality of wireless telephone 10 responsive to messages on the control channel using programs and data stored in memory 30. Processor 28 also controls the operation of wireless telephone 10 responsive to input from the user interface 32. The user interface 32 includes a keypad 34 as a user input device and a display 36 to convey information to the user. Other devices are frequently included in user interface 32, such as lights and special purpose buttons 38. The processor 28 controls the operation of transmitter 18 and receiver 16 over control lines 39 and 40, respectively, responsive to control messages and user input.

Microphone 42 receives sound input, converts the input into analog signals and delivers the analog signals to multi-stage transmitter 18. The signals from microphone 42 are received at a transmitter interface 44, which determines the frequency band that the mobile station is broadcasting on. The signal is delivered to either a high-band modulator 46 or a low-band modulator 48, which encode and/or modulate the signal according to the standard under which it is operating. For example, if the low-band is an analog system, then low-band modulator 48 modulates the signal onto its assigned frequency. On the other hand, if the high-band is a time division, multiple access (TDMA) or GSM system, the high-band modulator 46 converts the analog signal into digital data, encodes the data with error detection and correction information and multiplexes the data with control messages from processor 28. The combined data stream is modulated onto its assigned frequency.

The resultant signals from high-band modulator 46 and low-band modulator 48 are delivered to high-band transmitter front end 50 and low-band transmitter front end 52, respectively. The high-band transmitter front end 50 and the low-band transmitter front end 52 stages amplify the signal for transmission, in this exemplary embodiment. The resultant radio signal is broadcast to the wireless network through duplexor 14 and antenna 12.

Figure 2:
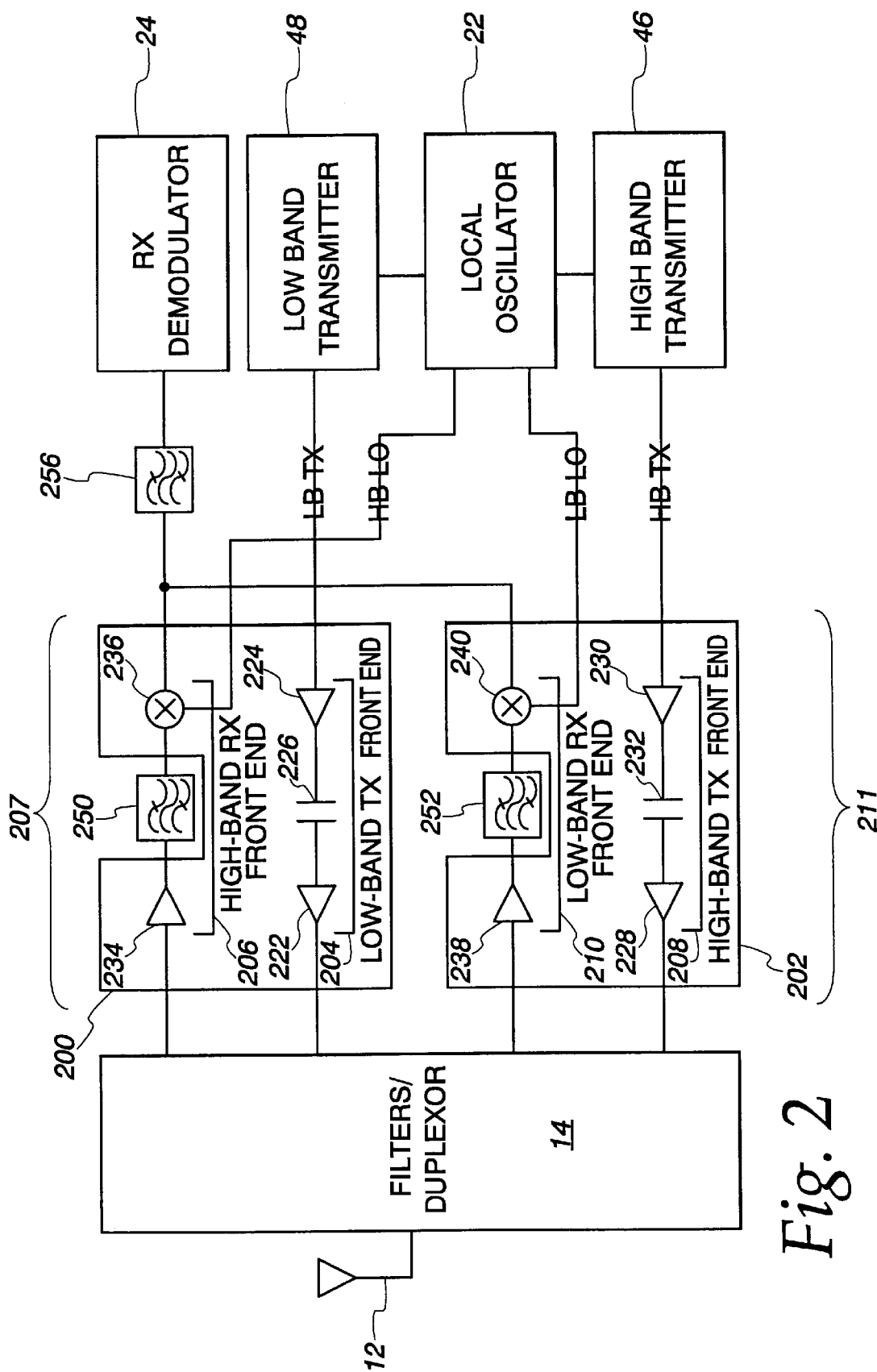
FIG. 2 is a block diagram of a first exemplary embodiment of this invention wherein the front end of the high-band receiver and the front end of the low-band power transmitter are integrated onto one substrate and the front end of the low-band receiver and the front end of the high-band power transmitter are integrated onto a second substrate.

Turning now to FIG. 2, a first embodiment of the fabrication of an integrated circuit according to an embodiment of this invention is shown. Two substrates 200, 202 are provided. In this exemplary embodiment, both substrates 200 and 202 are constructed of gallium arsenide (GaAs), which optimizes amplifier performance. Of course, other materials may be used. The front end stages of multi-stage transmitters and receivers are then fabricated on the substrates 200 and 202. In this exemplary embodiment of this invention, the low-band transmitter front end 204 and the high-band receiver front end 206 are fabricated on substrate 200, with the low-band transmitter front end 204, the high-band receiver front end 206 and substrate 200 being formed together as an integrated circuit component 207. The high-band transmitter front end 208 and low-band receiver front end 210 are fabricated on substrate 202 to produce a similar integrated circuit component 211. In this exemplary embodiment, the low-band transmitter front end 204 includes two amplifiers 222 and 224 and a capacitor 226, as known in the art. The high-band transmitter front end 208 also includes two amplifiers 228, 230 and a capacitor 232. The high-band receiver front end 206 includes the low-noise amplifier stage 234 and the mixer stage 236. The low-band receiver front end 210 also includes the low-noise amplifier stage 238 and the mixer stage 240. By fabricating stages of the transmitter of one frequency band with the receiver of the other, there is no interference from the power amplifier at the receiver because they will not operate at the same time.

The low-noise amplifier stages 234 and 238 are connected to filters 250 and 252, respectively, which provide frequency, band and image filtering, as is known in the art. Mixers 236 and 240 provide the down-conversion stage by mixing the radio frequency signal with a frequency from local oscillator 22. Both of the signals are filtered in the intermediate frequency filter 256, which provides the signal on the intermediate frequency to the demodulator 24 (FIG. 1).

The exemplary embodiment of FIG. 2 has several advantages. First, combining the transmitter power amplifiers 204, 208 with the receiver front end 206, 210 reduces costs by reducing the number of integrated circuit chips in the transceiver. The die area consumed by the receiver front end 206, 208 will be very small compared to the large power transistors 222, 224, 228 and 230; therefore, the incremental cost of adding the receiver front end 206, 208 will be small. The total area of the transceiver is reduced when the number of integrated circuit chips are reduced. Additionally, performance of the transceiver's receiver front end 206 and 208 is improved. There is currently a trend toward implementing receiver front ends in silicon rather than GaAs, despite the fact that GaAs provides better relative performance (in noise figure, gain and current). Combining the low-noise amplifier with the power transistors allows exploiting the improved performance of GaAs while minimizing the added cost. A disadvantage, however, is that integrated circuit 207, 211 will have a high pin (connector) count since there must be pins for the image filters 250, 252 and local oscillator 22 input. A high pin count may degrade the performance of the transmitter front end 204, 208.

Figure 3:
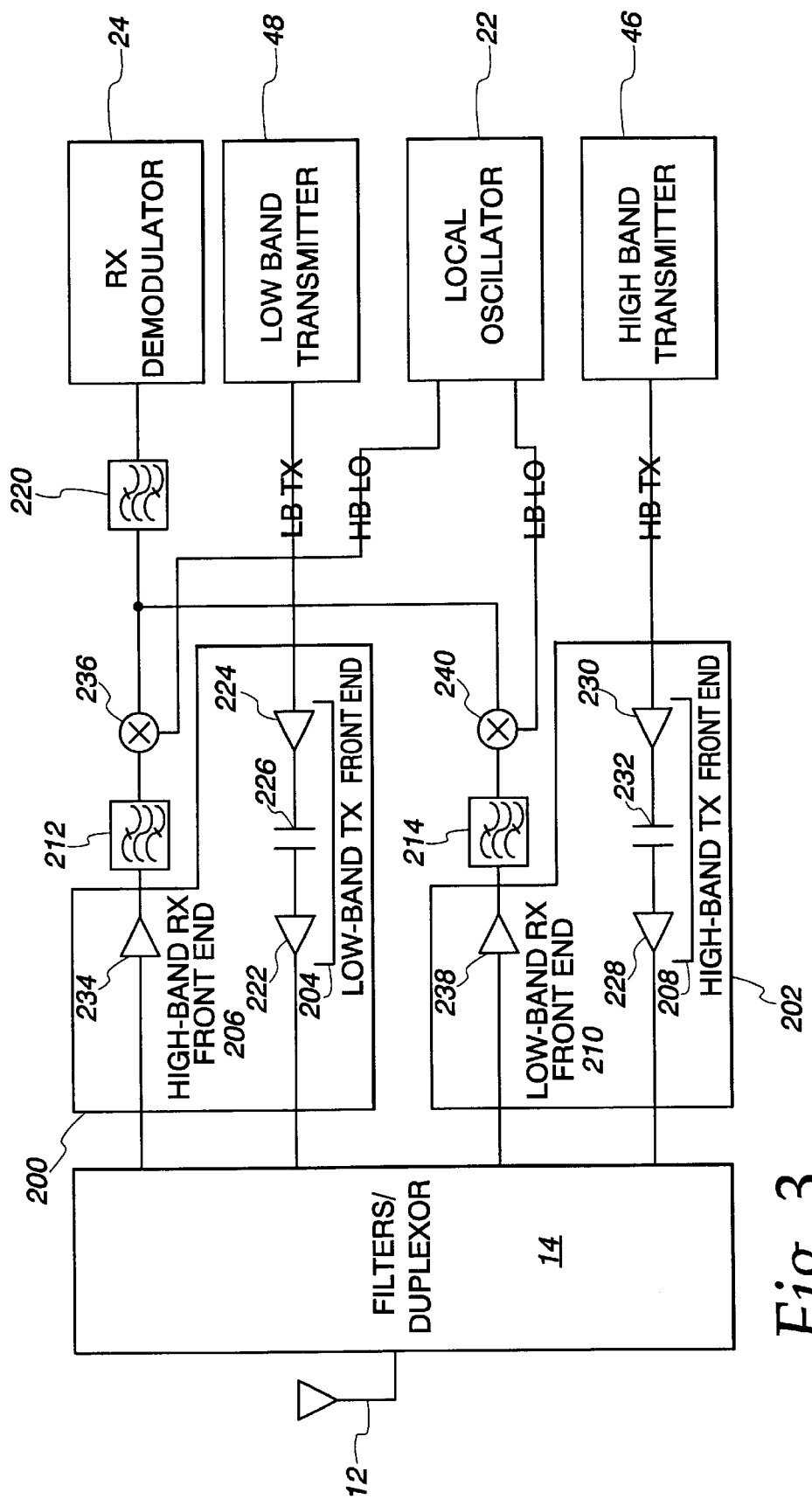
FIG. 3 illustrates a second block diagram of a further exemplary embodiment wherein the front end of the receivers only include the low-noise amplifiers integrated onto the substrates with the front end of the transmitters.

Turning now to FIG. 3, a second embodiment of this invention is shown. According to this embodiment, only the low-noise amplifier stages 234, 238 of the receivers are included on substrates 200 and 202 to produce preformed component sub-assemblies. In this embodiment, the mixers 236 and 240 may be part of the integrated circuits of the receiver, transmitter or any other logical portion of the dual-band radio. In this embodiment, the pin count is not increased significantly (only four extra pin should be needed: low-noise amplifier in, low-noise amplifier out, power for the amplifier and enable). The disadvantage is that the mixers must be placed somewhere else. This disadvantage is mitigated by the good low-noise amplifier performance attainable with GaAs (more low noise amplifier gain and less low noise amplifier noise reduces the performance required in the mixer).

Thus, the potential for less expensive integrated circuits is made possible, which circuits may be used in a transceiver that has both a high-band and a low-band. Of course, high band and low-band are, of course, relative terms, and may be any frequency used for communication and may be the same frequency. For example, the high-band may be CDMA or TDMA and the low-band may be analog.

What is claimed is:

1. A front end for a dual-band radio transceiver comprising:
   a first integrated circuit having a first power amplifier configured to amplify signals for transmission in a first frequency band and a first low-noise amplifier configured to amplify signals received in a second frequency band; and
   a second integrated circuit having a second power amplifier configured to amplify signals for transmission in said second frequency band and a second low-noise amplifier configured to amplify signals received in said first frequency band.

2. The transceiver front end of claim 1 wherein the transceiver includes a local oscillator, and wherein the first integrated circuit includes a first down-converter connected to the first low-noise amplifier and the local oscillator for mixing a received signal in the second frequency band with a frequency generated by the local oscillator.

3. The transceiver front end of claim 2 wherein the first down-converter comprises a mixer.

4. The transceiver front end of claim 1 wherein the transceiver includes a local oscillator, and wherein the second integrated circuit includes a second down-converter connected to the low-noise amplifier and the local oscillator for mixing a received signal in the first frequency band with a frequency generated by the local oscillator.

5. The transceiver front end of claim 4 wherein the second down-converter comprises a mixer.

6. The transceiver front end of claim 1 wherein the first integrated circuit includes a substrate comprising GaAs.

7. The transceiver front end of claim 1 wherein the second integrated circuit includes a substrate comprising GaAs.

8. A dual-band radio comprising:
   a transceiver including first and second integrated circuits;
   a first power amplifier configured forming part of said first integrated circuit to amplify signals for transmission in a first frequency band;
   a first low-noise amplifier forming a part of the first integrated circuit to amplify signals received in a second frequency band;
   a second power amplifier configured forming part of the second integrated circuit to amplify signals for transmission in a second frequency band; and
   a second low-noise amplifier forming a part of the second integrated circuit to amplify signals received in a first frequency band.

9. The dual-band radio of claim 8 further comprising a local oscillator, and wherein the first integrated circuit includes a first down-converter connected to the low-noise amplifier and the local oscillator to mix a received signal in the second frequency band with a frequency generated by the local oscillator.

10. The dual-band radio of claim 9 wherein the first down-converter comprises a mixer connected to the low-noise amplifier and the local oscillator.

11. The dual-band radio of claim 9 wherein the second integrated circuit includes a second down-converter connected to the second low-noise amplifier and the local oscillator to convert a received signal in the first frequency band to an intermediate frequency.

12. The dual-band radio of claim 11 wherein the second down-converter comprises a mixer connected to the low-noise amplifier and the local oscillator.

13. The dual-band radio of claim 8 wherein the first integrated circuit includes a substrate comprising GaAs.

14. The dual-band radio of claim 8 wherein the second integrated circuit includes a substrate comprising GaAs.

* * * * *